(12) United States Patent
Carley et al.

(10) Patent No.: US 6,797,163 B2
(45) Date of Patent: Sep. 28, 2004

(54) FILTRATION DEVICES

(75) Inventors: Joseph Christopher Carley, Blacksburg, VA (US); Mark Gerard Agresta, Blacksburg, VA (US)

(73) Assignee: Tetra Holding (US), Inc., Blacksburg, VA (US)

( * ) Notice: Subject to any disclaimer, the term of this patent is extended or adjusted under 35 U.S.C. 154(b) by 161 days.

(21) Appl. No.: 10/112,396

(22) Filed: Mar. 28, 2002

(65) Prior Publication Data

US 2003/0183571 A1 Oct. 2, 2003

(51) Int. Cl.[7] .................. B01D 35/027; A01K 63/04
(52) U.S. Cl. ................. 210/169; 210/232; 210/416.2; 210/435; 119/259; 119/260
(58) Field of Search ................. 210/169, 232, 210/416.2, 435; 119/259, 260, 261

(56) References Cited

U.S. PATENT DOCUMENTS

| | | | |
|---|---|---|---|
| 4,783,258 A | * | 11/1988 | Willinger et al. ........... 210/169 |
| 5,002,660 A | * | 3/1991 | Sherman et al. ............ 210/169 |
| 5,053,125 A | * | 10/1991 | Willinger et al. ........... 210/169 |
| 5,228,986 A | * | 7/1993 | Ellis et al. .................. 210/169 |
| 5,238,367 A | | 8/1993 | Ellis et al. |
| 5,397,463 A | | 3/1995 | Woltmann |
| 5,401,401 A | | 3/1995 | Hickok et al. |
| 5,603,831 A | | 2/1997 | Hickok |
| 5,728,293 A | | 3/1998 | Guoli et al. |
| 5,965,016 A | | 10/1999 | Suchowski et al. |

OTHER PUBLICATIONS

Exhibit A—Fluval® 2plus Underwater Filter Brochure, 4 pages (Date: Publicly known prior to the filing date of the present application.).

Exhibit B—Tetratec® Brochure, 4 pages (Date: Publicly known prior to the filing date of the present application.).

* cited by examiner

Primary Examiner—David A. Reifsnyder
(74) Attorney, Agent, or Firm—Merchant & Gould P.C.

(57) ABSTRACT

The present invention relates to filter devices and methods of using such devices for mechanical, chemical and biological filtration pond and/or aquarium water.

20 Claims, 9 Drawing Sheets

FILTRATION DEVICES

TECHNICAL FIELD

The present invention relates to aquarium and/or pond filter devices and methods of using such devices.

BACKGROUND OF THE INVENTION

Aquariums have long been popular for keeping and displaying fish, both fresh and saltwater varieties. However, the recreation of freshwater or saltwater environments in the self-contained systems of home aquariums has presented considerable difficulties. Initially a good water source must be obtained for the start of the aquarium. Additionally, there's the task of maintaining the water quality and dealing with waste materials either i) excreted by the aquatic specimens, ii) formed by the natural decomposition by bacteria of plant, animal tissues and food, or iii) resulting from foreign contamination of the aquarium environment. This task becomes even more important with saltwater environments, which must maintain many delicate balances including pH and salinity.

It is generally understood that in maintaining the health and vitality of the animals confined to an aquarium, provision must be made for continuous filtration and recirculation of the aquarium water. A number of differently configured aquarium filter systems have been devised in an attempt to meet this need. One such system is the external aquarium filter in which a filter housing is located outside the aquarium tank and positioned such that the aquarium water is drawn up from the aquarium and into the filter by means of external tubes or tubular extensions.

A typical external filter system consists of an electrically powered pump, intake and return lines or tubes, a filter housing containing and a filter medium such as activated charcoal overlaid with one or more layers of synthetic filter material. As water is siphoned out of the aquarium tank via an inlet tube, it moves through the filter housing inlet chamber into the central housing chamber where it passes through the filter medium into the housing outlet chamber and is pumped back into the aquarium via the return line.

Although the external filter device is generally adequate for providing mechanical filtration, external aquarium filter systems are usually large and bulky. Additionally, the presence of such additional components as intake and return lines (or tubing) tends to create bulkiness and increases the risk of clogging and/or mechanical breakdown.

Another type of aquarium filter system presently in use is the undergravel aquarium filter, specifically designed for placement within the aquarium tank. This type of system is comprised of inlet and outlet tubes, a pumping device, a means for aerating the aquarium water, and a filter housing composed of inlet and outlet chambers where the outlet chamber contains a filter medium such as activated charcoal. Water from the aquarium is pumped through the inlet tube to outlet chamber through and exits to the aquarium tank via the outlet tube.

One problem inherent in the undergravel aquarium filter concerns its size. Since such a system is dimensionally configured so as to be unobtrusive when placed within the aquarium tank, its filter housing is relatively small. Therefore, the volume of filter material contained within the housing is generally not sufficient to provide adequate mechanical filtration. Another problem with this type of system concerns the location of the filter. Because the filter is positioned underwater within the aquarium tank, the filter housing must be physically separated from the system and removed from the aquarium tank to accomplish cleaning of the filter; a procedure which disturbs the aquarium environment and interrupts the entire filtering process.

Accordingly, it would be advantageous to provide aquarium filters which are small enough in size and number of components so as not to be "large and bulky", yet still provide convenience of handling and adequate mechanical filtration capacity. It is, therefore, an object of the present invention to provide filtration devices which avoid the aforementioned problems.

Another aspect of the present invention is to provide relatively small sized filtration devices for use in a variety of different sized aquariums.

Still another aspect of the present invention is to provide tubeless filtration devices.

Yet another aspect of the present invention is to provide tubeless filtration devices which reduce or eliminate premature overflow of the mechanical filter chamber and/or filtration device housing.

These and other aspects will become readily apparent from the detailed description which follows.

SUMMARY OF THE INVENTION

The present invention relates to tubeless filter devices, comprising:

a) a mechanical filtration chamber, preferably in the form of a cylindrical or substantially cylindrical container having a latitudinal cross-section of curvilinear shape, containing at least one mechanical filter for filtering water, the mechanical filtration chamber having a spillway through which filtered water exits the mechanical filtration chamber back to, for example, an aquarium;

b) a water flow pump mechanism having inflow port and an outflow port in fluid flow communication with the mechanical filtration chamber for drawing contaminated water from a reservoir, such as an aquarium, through the inflow port so as to pump the water into the mechanical filtration chamber through the outflow port; and c) optionally, a positioning mechanism adjustably attached to the housing for positioning the filter apparatus on or at the surface of the aquarium water such that the water pump mechanism can receive aquarium water without the need for tubes or tubular extensions.

The present invention further relates to methods of filtering aquarium or pond water by using the filtration devices described herein.

The term "tubes or tubular extensions", as used herein, refers to tubes or tubular components used as external connections or attachments for transporting water to or from filtration devices, more specifically aquarium filtration devices, and preferably tubes or tubular extensions which are at least 1 inch, more preferably at least 0.5 inches in length.

BRIEF DESCRIPTION OF THE DRAWINGS

The following FIGURES represent one particular embodiment of the present invention.

DESCRIPTION OF A DISCLOSED EMBODIMENT

Referring now to FIGS. 1–9, there is shown a filtration device assembly designated generally by the numeral 10. The assembly comprises an outer housing 1, having an upper section 1a which forms filter chamber 17 and a lower section 1b which extends beyond the lower boundary of filter chamber 17. The housing 1 is, preferably, in the form of a cylindrical or substantially cylindrical container having a latitudinal cross-section of curvilinear shape, preferably a latitudinal cross-section of elliptical or oval shape. In the described embodiment, the filtration device is supported on the aquarium 20 by an adjustable hanging mechanism which is adjustably attached to the housing 1 via prong 12. The hanging mechanism can take the form of a hook 4 (having adjustable attachment slots 25a and 25b) or, optionally, suction cup 6a. Additional support can by provided by, optionally, incorporating at least one other suction cup 6b.

Water from the aquarium is brought into the aquarium filter using flow pump 2 having inflow port 14 and outflow port 16. The flow pump 2 is positioned in fluid flow communication with filter chamber 17 and, preferably, shielded by lower section 1b. In one embodiment, the filtration device is positioned in a aquarium 20 such that the flow pump 2 is below or touching the surface of the aquarium water at inflow port 14. The flow pump 2 comprises power stator motor 15 and an impeller or an impeller assembly 11 rotatably attached or in rotatable association with the motor 15 for driving the flow pump 2.

When the power stator motor 15 is powered (e.g., electrically via power cord 3 in cord holder 5), impeller 11 within the flow pump 2 is caused to rotate which, in turn, causes aquarium water to be drawn from the aquarium tank through inflow port 14 and into flow pump 2. A flow control switch 13 can be, optionally, incorporated onto water flow pump 2 for adjusting the amount of water drawn into the flow pump 2. The water drawn into the flow pump 2 passes by the impeller 11, through outflow port 16 and into mechanical filtration chamber 17.

Figure 1:
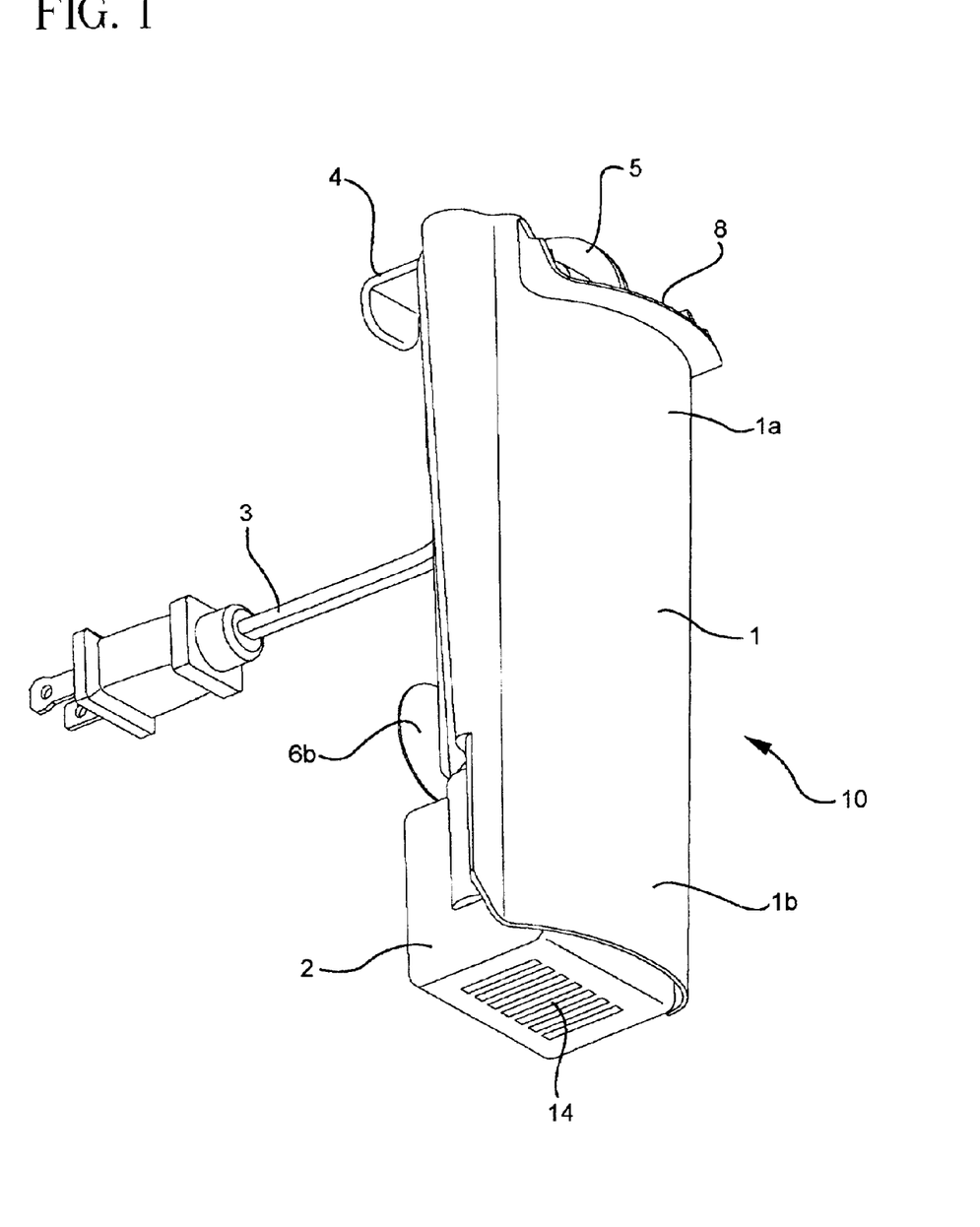
FIG. 1 is a perspective view of the filtration device of the present invention.
Figure 2:
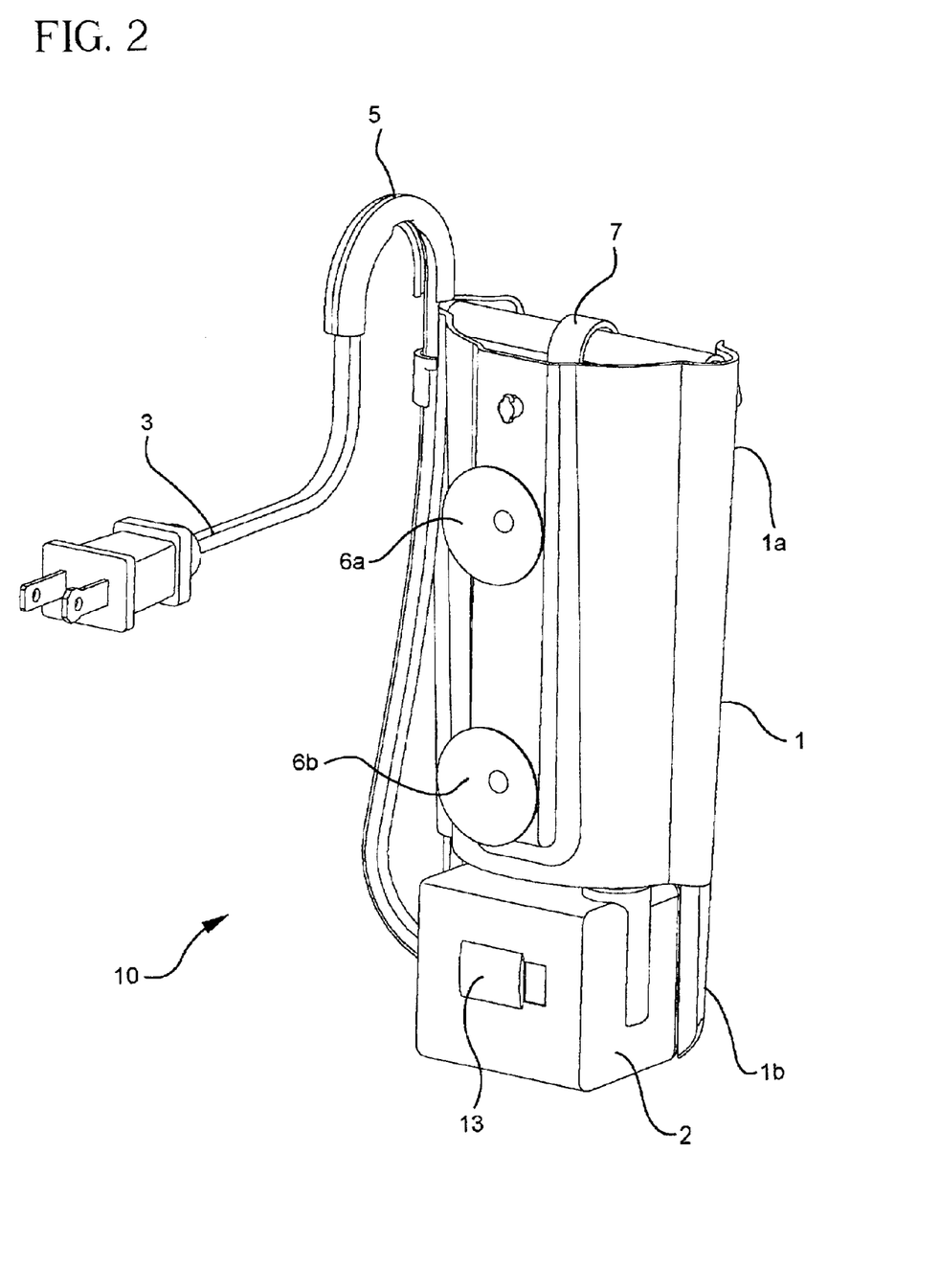
FIG. 2 is a rear perspective view of the filtration device of the present invention.
Figure 3:
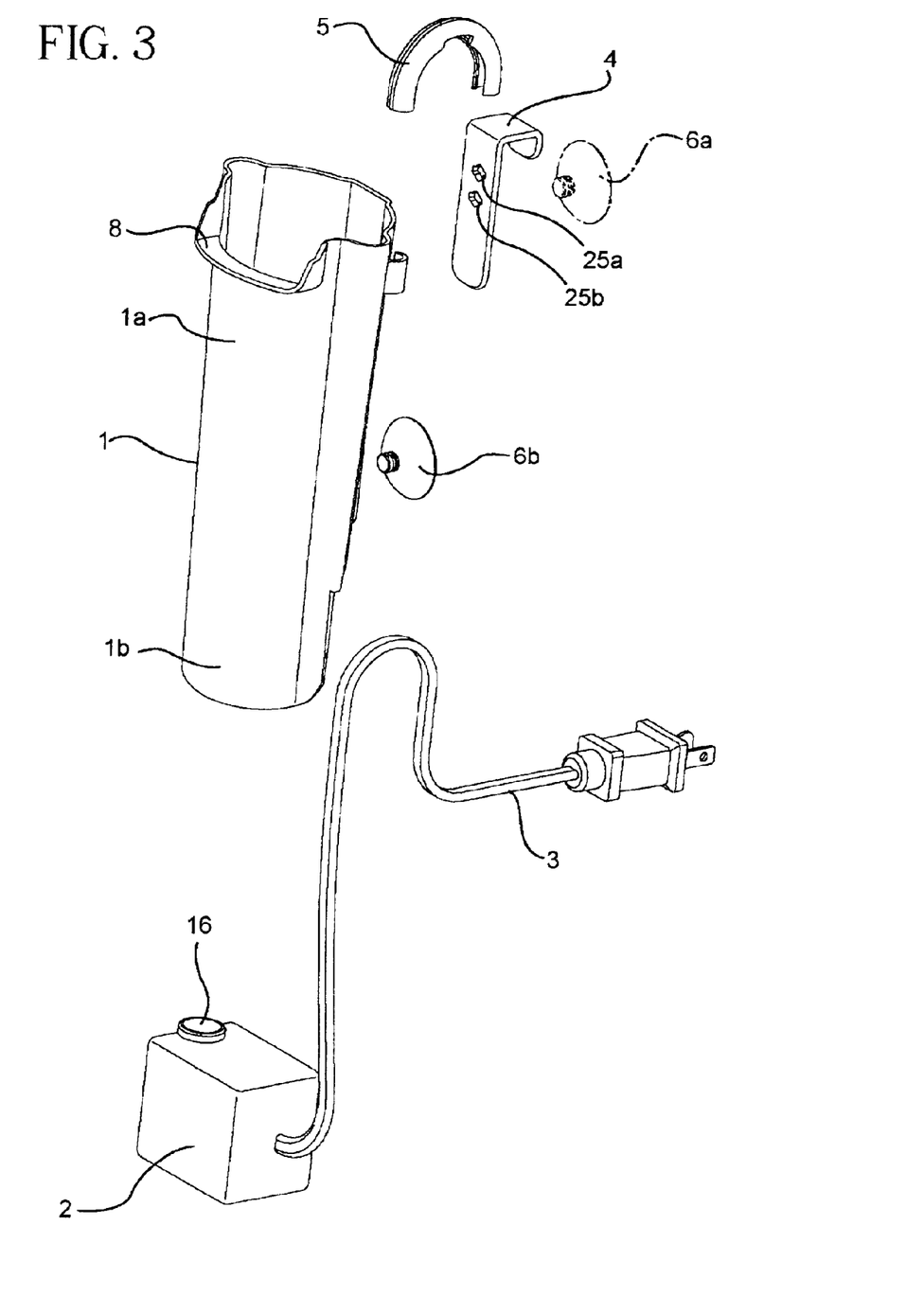
FIG. 3 is an exploded perspective view of the filtration device of the present invention.
Figure 4:
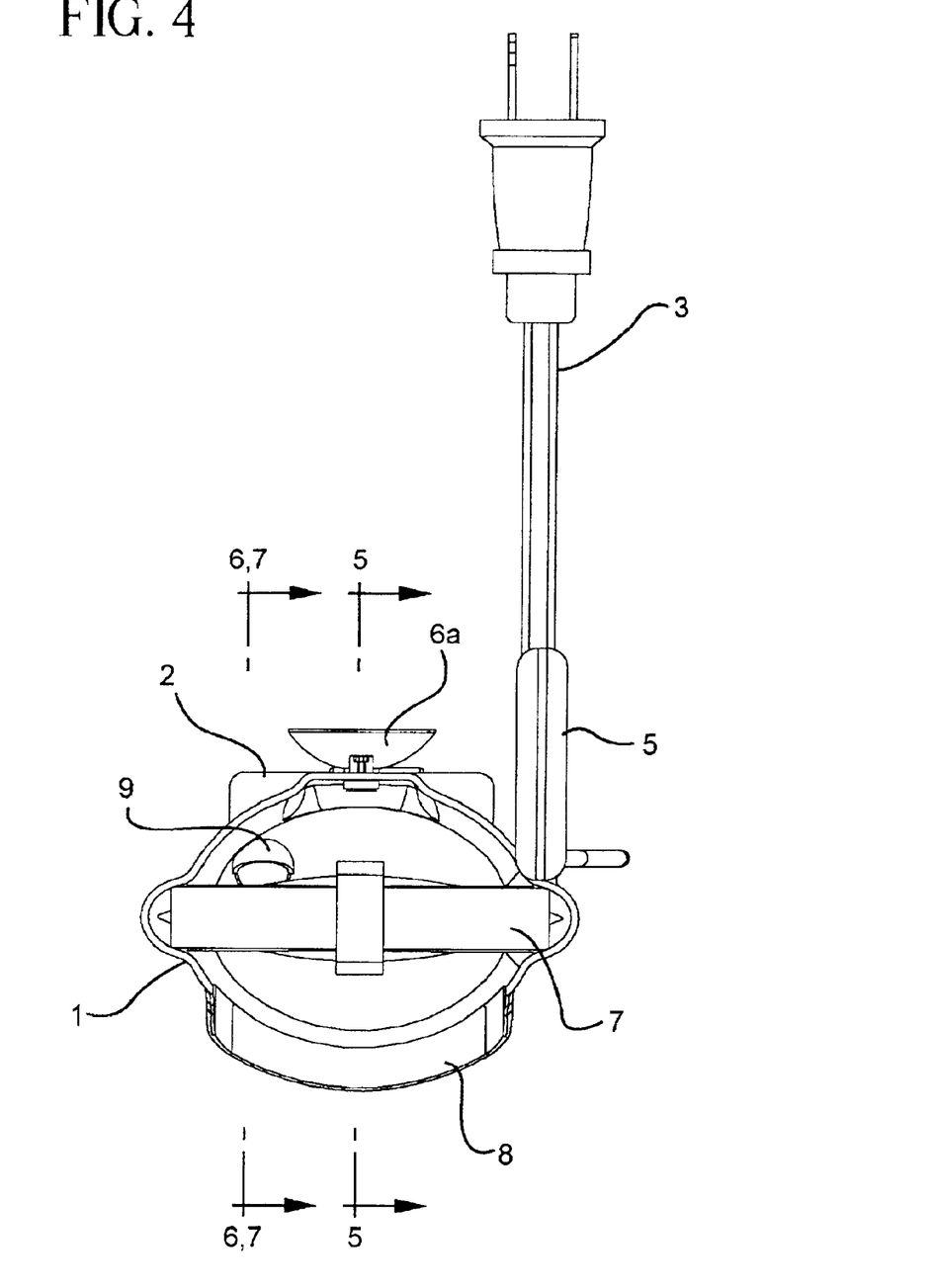
FIG. 4 is a top plan view of the filtration device of the present invention.
Figure 5:
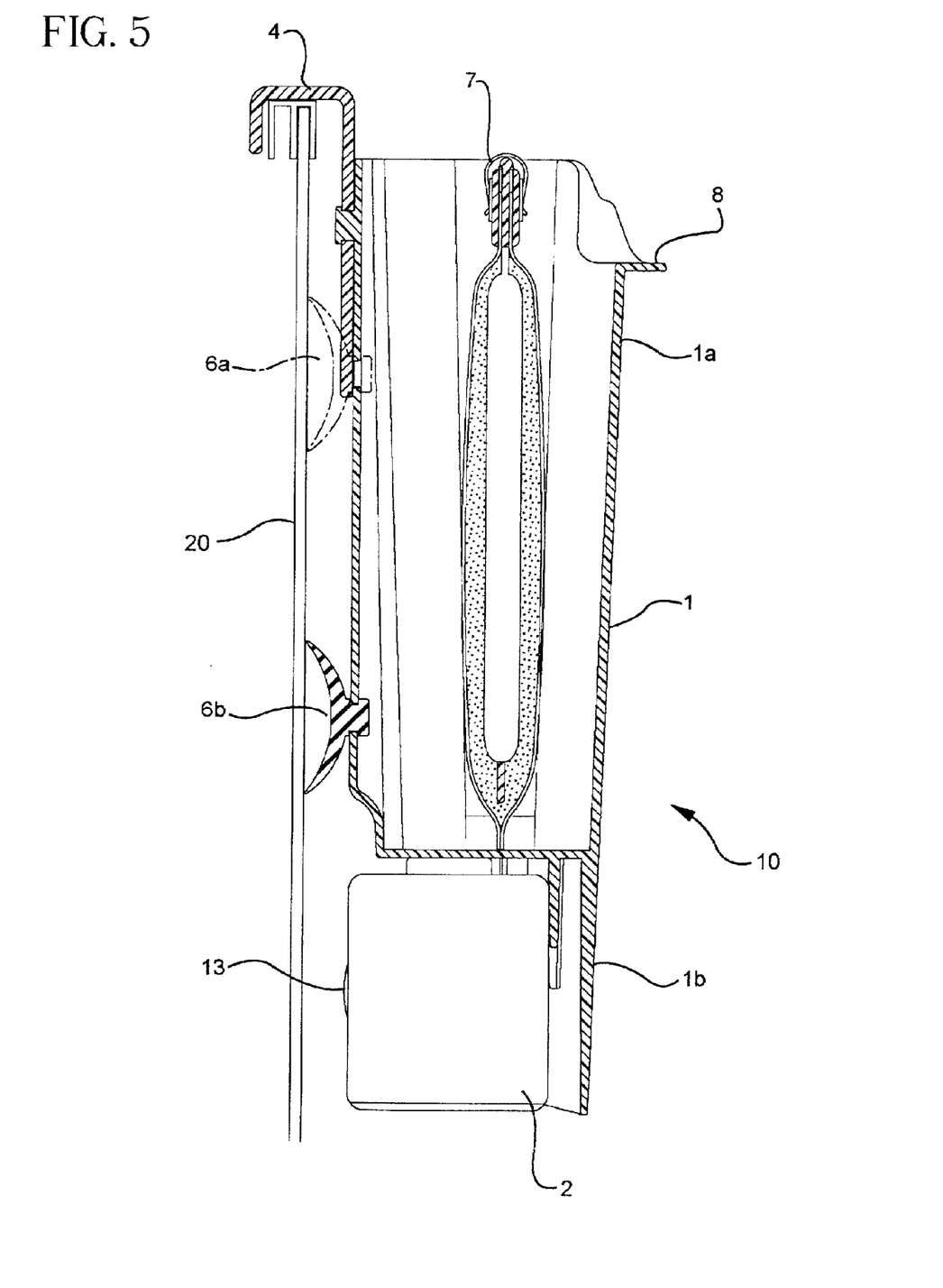
FIG. 5 is a sectional view of the inside of the filtration device housing of the present invention taken along lines 5—5 of FIG. 4.
Figure 6:
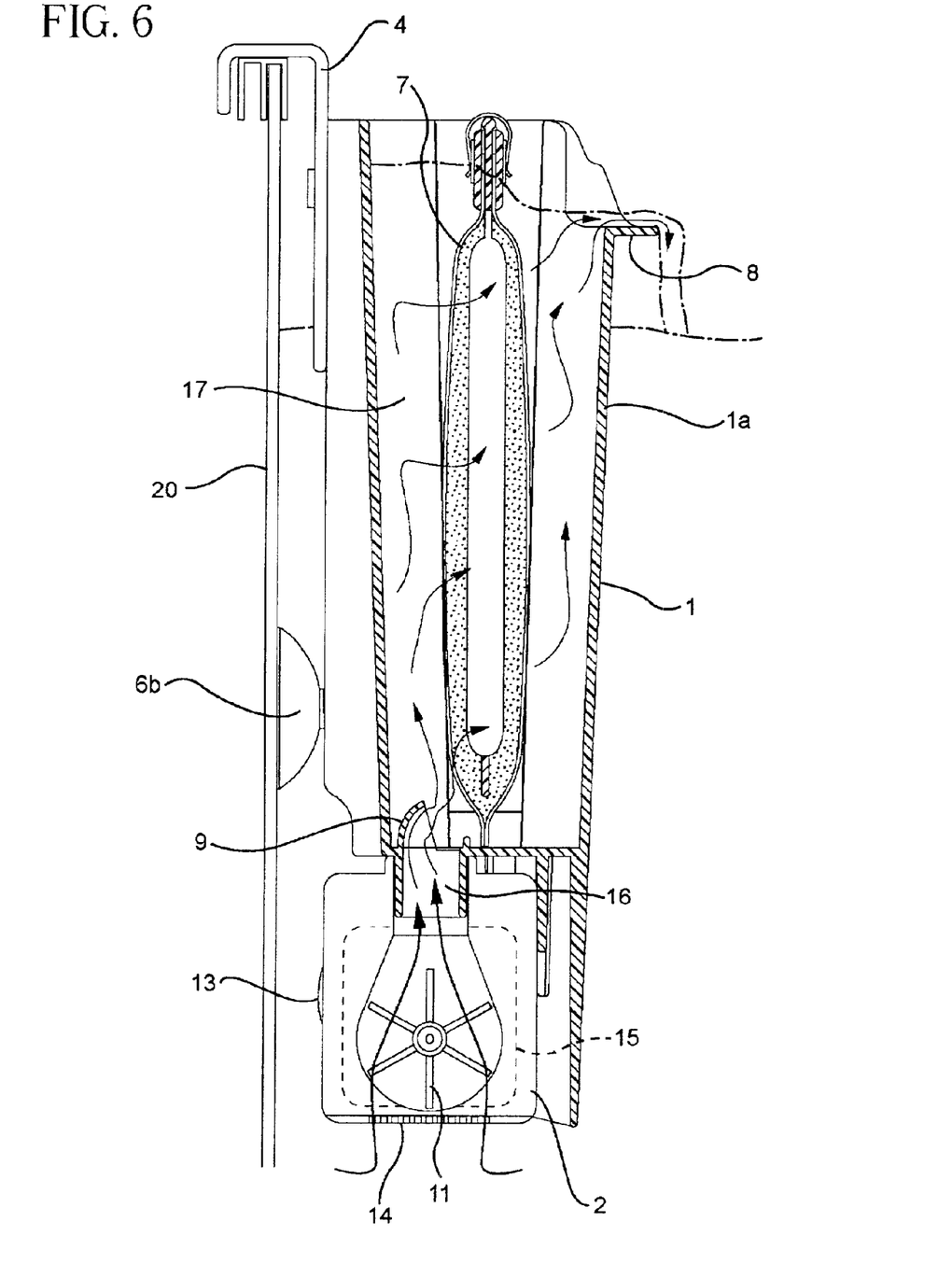
FIG. 6 is a sectional view of the inside of the filtration device housing of the present invention taken along lines 6—6 of FIG. 4, showing the directional flow of water in the presence of a Turbulence Reducer component.
Figure 7:
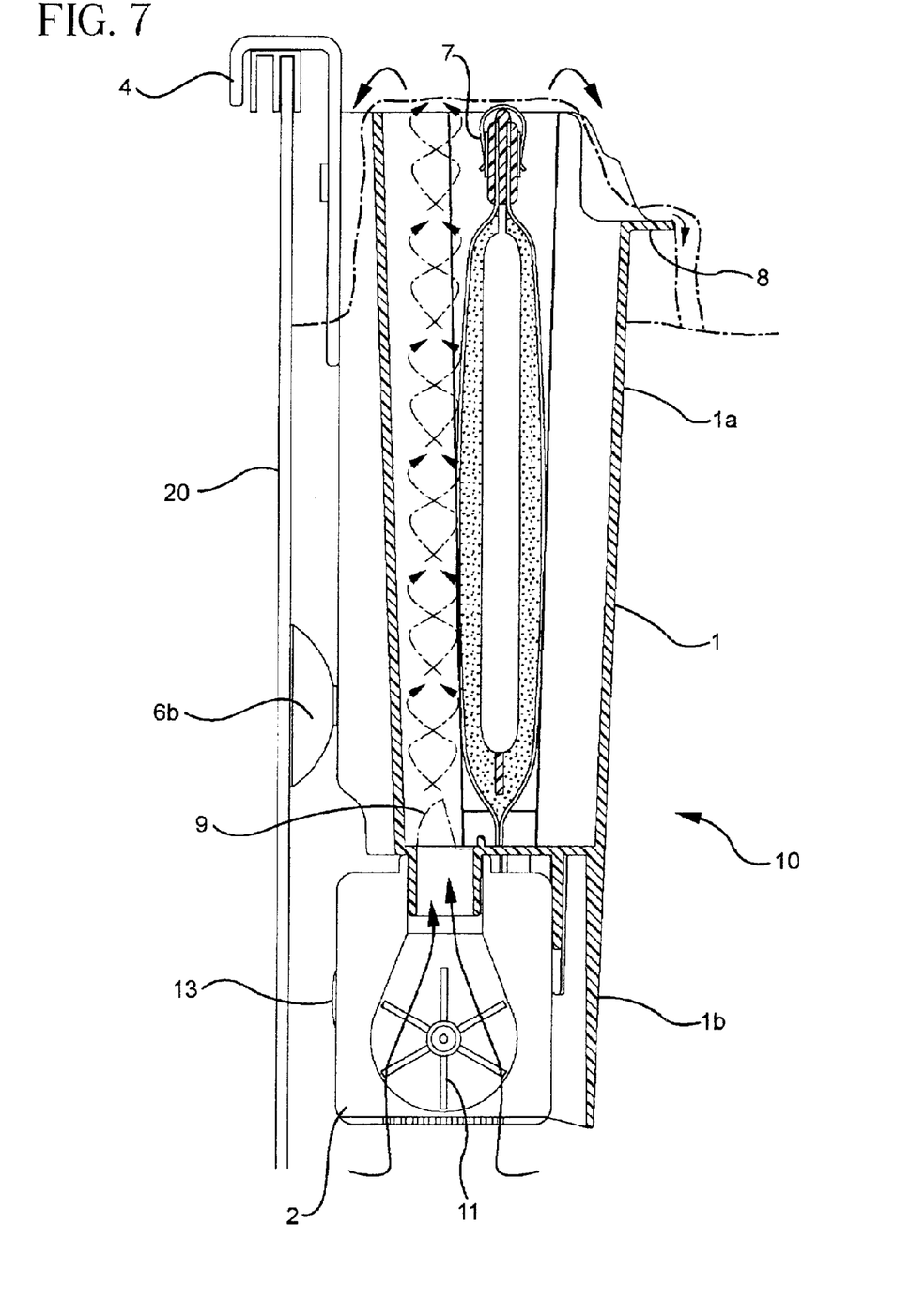
FIG. 7 is a sectional view of the inside of the filtration device housing of the present invention taken along lines 6—6 of FIG. 4, showing the directional flow of water in the absence of a Turbulence Reducer component.
Figure 8:
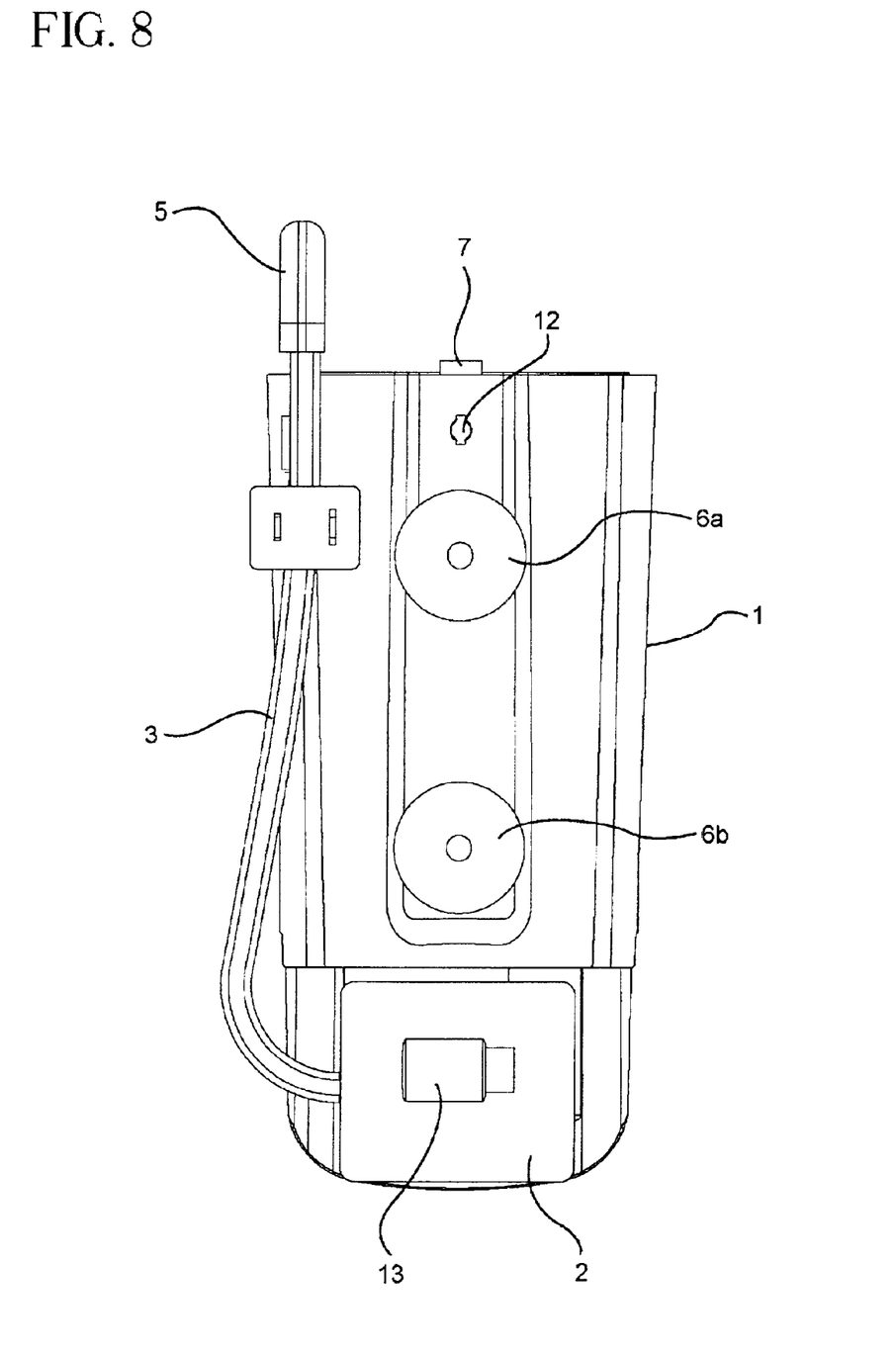
FIG. 8 is a rear view of the filtration device of the present invention.
Figure 9:
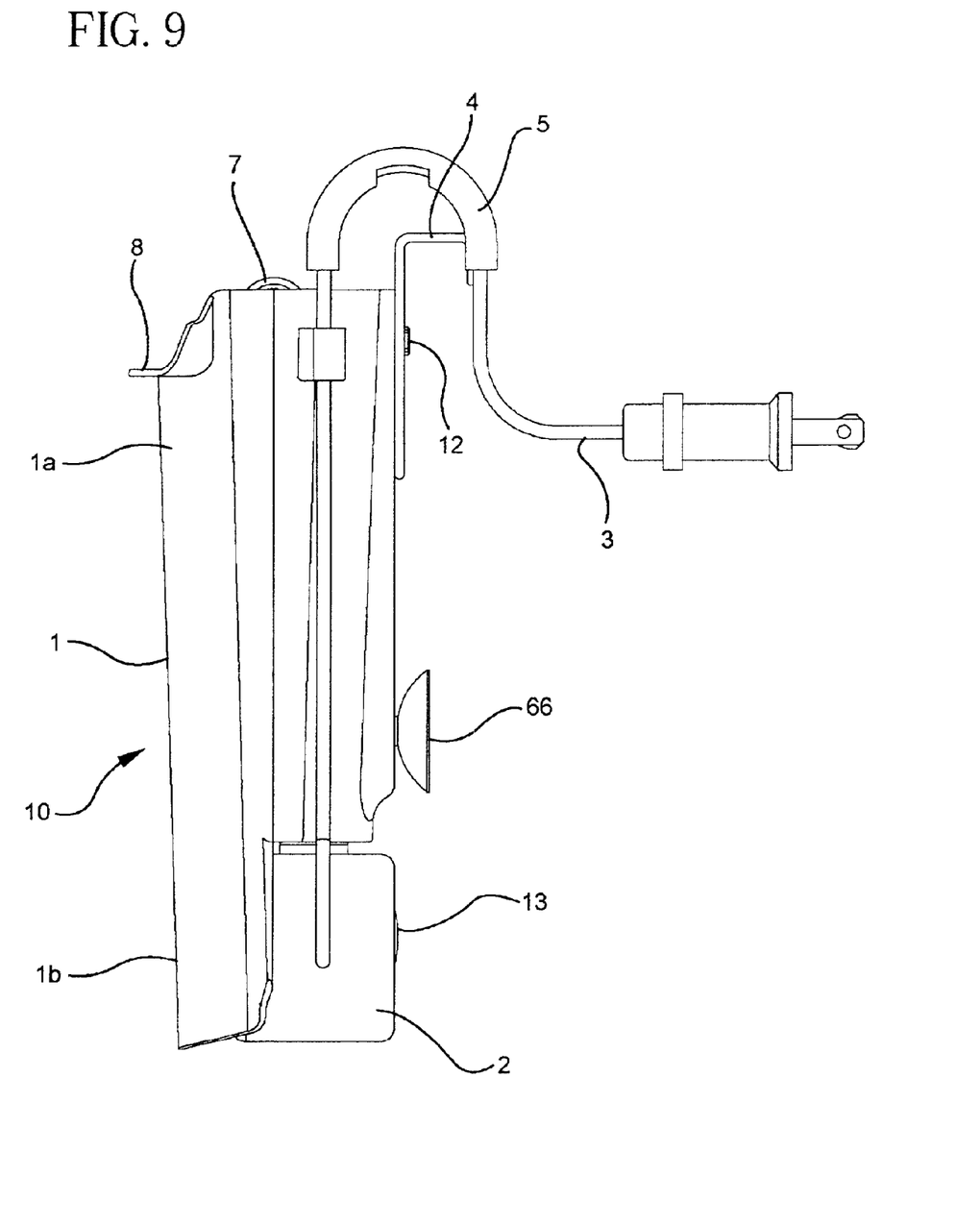
FIG. 9 is a side view of the filtration device of the present invention.

Contained within the mechanical filtration chamber 17 is a means for the mechanically filtering the aquarium water, typically in the form of filter cartridge 7. Filtration is performed as the aquarium water flows directionally through the filter cartridge 7 as illustrated in FIG. 6.

The filter cartridge 7 may consist of non-woven synthetic resin fibers and/or a coarse sponges. The Bio Bag® filter is an example of a filter cartridge that may be used. The Bio Bag® can also hold a quantity of activated carbon to effect chemical as well as mechanical filtration. Nonwoven synthetic resin fibers are preferred for use herein. Without being limited by theory, it is believed that the resin fibers, in view of their large surface area, provide a medium for biological filtration by creating an environment conducive for bacterial growth. In an aquarium, biological filtration is important since it serves to rid the tank of (or nitrify) toxic ammonia.

Bio Bag filters are described in detail in U.S. Pat. Nos. 4,783,258 and 5,053,125, both of which are herein incorporated by reference in their entirety.

Optionally, turbulence reducer 9 can be incorporated in fluid flow communication with flow pump 2 at outflow port 16 to improve the directional flow of the water through filter cartridge 7. In one embodiment, the turbulence reducer 9 can take the form of a water flow diverter component. This improvement in directional water flow results primarily from the reduction and/or prevention of water turbulence inside the housing which, in turn, reduces and/or prevents aquarium water from prematurely flowing up and over filter cartridge 7 (See FIG. 7). Without being limited by theory, water overflowing the top of filter cartridge 7 typically signals the need for cartridge replacement since clogged filters tend to force water up and over the filter cartridge 7 instead of through the filter cartridge 7. Preventing or reducing premature overflow (i.e., in the absence of a clogged filter cartridge) of the filter cartridge 7 by incorporating turbulence reducer 9 can, therefore, aid in properly determining the useful life of filter cartridges. In one embodiment, turbulence reducer 9 is in the form of a water diverter component.

After passing through the mechanical filtration chamber 17, the water passes via a spillway 8 back into the aquarium. Spillway 8 directs the water away from the filter in such a way as to produce a "waterfall" affect. Without being limited by theory, it is believed that such an affect improves the agitation of the aquarium water such that gas exchange is increased and the oxygenation of the aquarium water is improved.

It will be understood that each of the elements described above, or two or more together, may also find a useful application in other types of constructions differing from the types described above.

While the invention has been illustrated and described as embodied in a filter for aquariums, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A tubeless filter apparatus, comprising:
  a) a mechanical filtration chamber containing at least one mechanical filter for filtering water, said mechanical filtration chamber having a spillway over which filtered water exits the mechanical filtration chamber; and
  b) a water flow pump arranged to be positioned at least partially underwater in a reservoir during operation, the water flow pump having a tubeless inflow port and an outflow port in fluid flow communication with the mechanical filtration chamber for drawing contaminated water from the reservoir through the inflow port so as to pump the water into said mechanical filtration chamber through the outflow port.

2. A tubeless filter apparatus according to claim 1, wherein the mechanical filter chamber is in the form of a cylindrical or substantially cylindrical container having latitudinal cross-section of curvilinear shape.

3. A tubeless filter apparatus according to claim 2, wherein the shape of the latitudinal cross-section is elliptical or oval.

4. A tubeless filter apparatus according to claim 1, wherein the water flow pump comprises a stator motor and an impeller rotatably attached to or associated with the motor for driving the flow pump.

5. A tubeless filter apparatus according to claim 4, wherein the stator motor is electrically powered.

6. A tubeless filter apparatus according to claim 1, further including a positioning mechanism interconnected to the mechanical filtration chamber, the positioning mechanism being configured to position the tubeless filter apparatus within the reservoir.

7. A tubeless filter apparatus according to claim 6, wherein the positioning mechanism is adjustable to adjust the position of the filter apparatus relative to the reservoir.

8. A tubeless filter apparatus according to claim 7, wherein the positioning mechanism is selected from the group consisting of a hook, a suction cup or a combination thereof.

9. A tubeless filter apparatus according to claim 8, wherein the hook is an adjustable height hook.

10. A tubeless filter apparatus according to claim 1, further comprising a turbulence reducer located at the outflow port of the water flow pump for preventing water turbulence as the water enters the mechanical filtration chamber.

11. A tubeless filter apparatus according to claim 10, wherein the turbulence reducer is in the form of a water flow diverter component.

12. A tubeless filter apparatus according to claim 1, further comprising a biological filtration component positioned within or adjacent to the mechanical filtration chamber.

13. A tubeless filter apparatus according to claim 1, further comprising a chemical filtration component positioned within or adjacent to the mechanical filtration chamber.

14. A tubeless filter apparatus according to claim 1, wherein the spillway component causes the water exiting the filter to enter the aquarium in the form of a waterfall.

15. A tubeless filter apparatus for filtering aquarium water contained within an aquarium tank, comprising:
  a) a filter housing defining a mechanical filtration chamber, the mechanical filtration chamber containing at least one mechanical filter for filtering aquarium water, the mechanical filtration chamber having a spillway over which filtered water exits the mechanical filtration chamber back to the aquarium tank;
  b) a water flow pump including a pump housing, the pump housing having an inflow port and an outflow port in fluid flow communication with the mechanical filtration chamber for drawing contaminated water from the aquarium tank through the inflow port so as to pump the water into the mechanical filtration chamber through the outflow port; and
  c) a positioning mechanism adjustably attached to the filter housing for positioning the inflow port of the pump housing at or below the surface of the aquarium water such that the water pump can receive aquarium water without the need for tubes or tubular extensions.

16. A method for filtering aquarium water contained within a reservoir, the method comprising the steps of:
  a) providing a filter assembly, the filter assembly including a mechanical filtration chamber having at least one mechanical filter for filtering water and a water flow pump having a tubeless inflow port and an outflow port in fluid flow communication with the mechanical filtration chamber;
  b) positioning the filter assembly within the reservoir such that at least a portion of the water flow pump is submerged within the water;
  c) drawing water from the reservoir through the tubeless inflow port and pumping the water into said mechanical filtration chamber through the outflow port;
  d) filtering the water; and
  e) directing the filtered water over a spillway to return the filtered water to the reservoir.

17. A filter apparatus for filtering water contained within a reservoir, the filter apparatus comprising:
  a) a housing defining a filter chamber, the housing having a bottom and a top;
  b) a mechanical filter positionable within the filter chamber from the top of the housing;
  c) a water pump arranged in fluid communication with the filter chamber, the water pump being positioned beneath the bottom of the housing;
  d) wherein the water pump is at least partially submerged in the reservoir during operation.

18. A filter apparatus according to claim 17, wherein the water pump includes a pump housing, the pump housing having tubeless inflow structure that is submerged in the reservoir during operation.

19. A filter apparatus according to claim 18, wherein the tubeless inflow structure includes at least one aperture formed in the pump housing.

20. A filter apparatus according to claim 19, wherein the at least one aperture is formed in a bottom planar surface of the pump housing.

* * * * *